Patented June 28, 1932

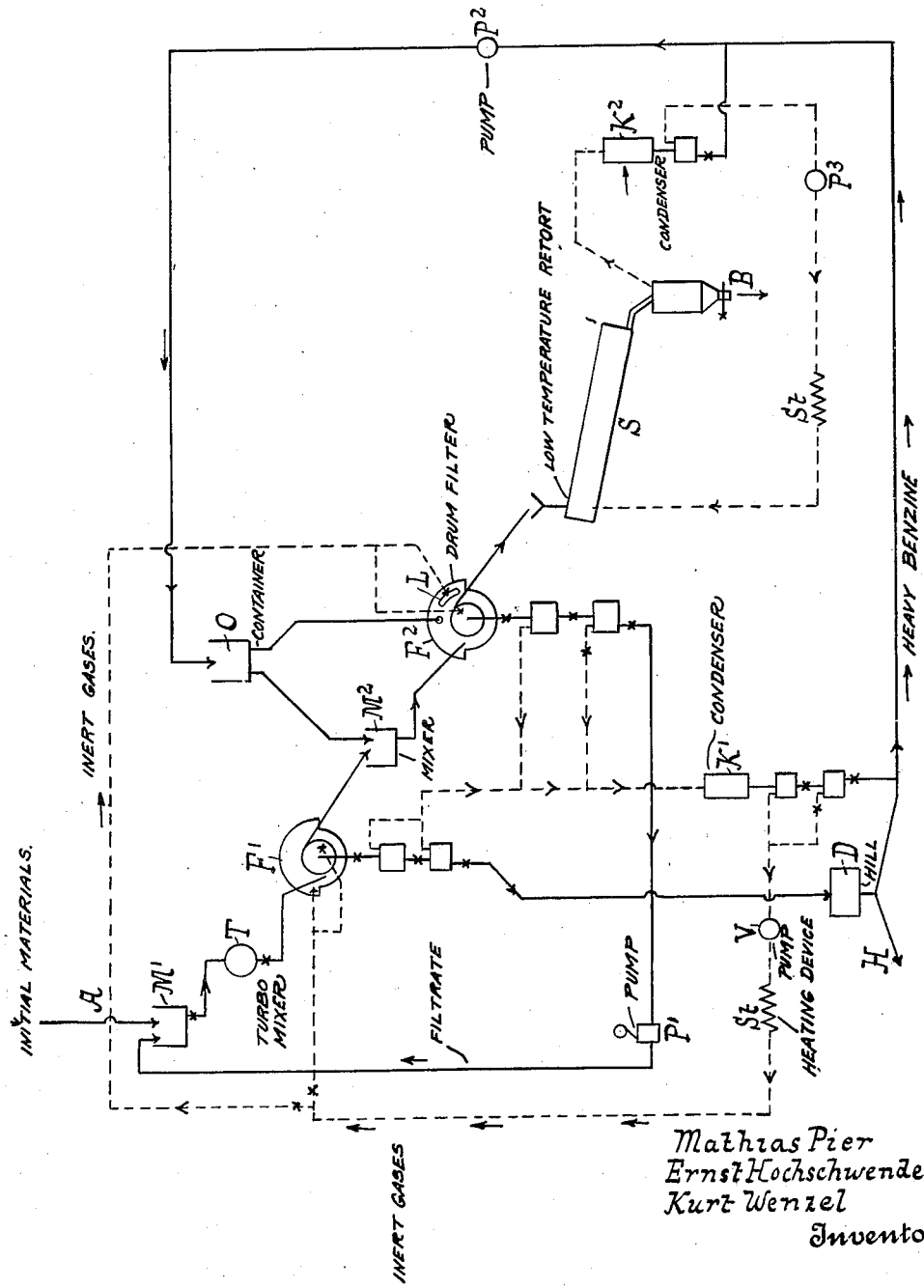

1,864,856

UNITED STATES PATENT OFFICE

MATHIAS PIER, OF HEIDELBERG, ERNST HOCHSCHWENDER, OF LUDWIGSHAFEN-ON-THE-RHINE, AND KURT WENZEL, OF MANNHEIM, GERMANY, ASSIGNORS, BY MESNE ASSIGNMENTS, TO STANDARD-I. G. COMPANY, OF LINDEN, NEW JERSEY, A CORPORATION OF DELAWARE

SEPARATION FROM SOLID RESIDUES OF OILS OBTAINED IN THE DESTRUCTIVE HYDROGENATION OF CARBONACEOUS MATERIALS

Application filed January 8, 1929, Serial No. 331,057, and in Germany January 28, 1928.

This invention relates to improvements in and apparatus for the separation, from solid residues, of oils obtained in the destructive hydrogenation of carbonaceous materials, such as varieties of coal, tars, mineral oils, conversion, extraction, distillation products and residues thereof and the like.

It has been proposed to separate oils, bitumens, asphaltums and the like from solid substances containing the same, such as varieties of coal, shale and the like, by the aid of extraction agents, such as benzene, for example from the oily products, such as residues and the like, obtained by the destructive hydrogenation of varieties of coal, tars, mineral oils and the like. The methods of working hitherto practised, however, and mostly adapted for working only on a small scale, are very cumbrous and expensive, and they are also usually inadequate.

We have now found that the separation of the said oils obtained by destructive hydrogenation, from the solid residues, from which the low boiling constituents have been removed, can be effected in a highly advantageous manner by filtration, such filters being employed as enable the solvent, the mixture to be separated, and also the extracted products and extraction residues, to be continuously supplied and removed. Although the mixture under treatment can be filtered without using solvents, especially when the operation is accompanied by flushing with inert gases, the rate of filtration in practice is low and the separation of the oil is incomplete. No substantial improvement is obtained even by raising the temperature, whilst unduly raising the temperature is undesirable for economic reasons and also because it leads to undesired decomposition of the carbonaceous material. The employment of suitable solvents for extraction, however, enables the mixtures under consideration to be brought into a filterable condition and also rates of filtration suitable in practice to be attained. The solvents employed according to our present invention preferably consist of suitable destructive hydrogenation products which are recovered in the process from which the residues to be treated have been produced. Advantageous solvents comprise the products of destructive hydrogenation boiling below 300° C., for example, heavy benzine produced in the destructive hydrogenation of coal and the like, or light middle oils boiling at from about 150° to 300° C., and employed at temperatures of from about 90° to 150° C. But the most various solvents for the oils to be extracted may be employed in our process, for example, benzene or carbon disulphide and the like. Mixtures of various solvents may also be employed as the extraction agents, and substances which cause the rapid deposition of the floating solid constituents, for example, readily volatile substances of quite a different nature, such as methanol, acetone, carbon tetrachloride and the like may be added to the solvents. In the extraction of residues obtained by the destructive hydrogenation of brown coal, use is made, for example, of middle oils recovered in the said destructive hydrogenation process itself. It may be of advantage, especially when dealing with residues rich in asphaltic substances, to employ extraction agents having a high content of aromatic compounds. Inasmuch as only small amounts of the extracting agents are to be made up according to the present process, a small plant can be operated, under such conditions, in conjunction with a plant for the destructive hydrogenation of brown coal, that an oil chiefly containing aromatic constituents is formed, for example, by treating ordinary coal or a mixture of coal and brown coal, which oil is employed to extract the residues produced in the whole plant. In the case of a destructive hydrogenation plant in which coal is treated, oils with a low content of aromatic constituents, such as the destructive hydrogenation products from coal, with boiling points up to about 300° C. may be employed directly for the extraction.

The operation may also be conducted at higher or lower temperatures the temperature employed depending on the nature of the solvent and the character of the materials under treatment. Thus, for example, the temperature at which the treatment is carried out should not be higher than the upper boiling point limit of the solvent. If viscous products are treated, it will, as a rule, be advantageous to treat these at higher temperatures than less viscous products.

A particularly high rate of filtration is obtained when the relative proportions of the residues under treatment and the solvent are approximately 1:1. After recovery, the solvent can be used again for the extraction and filtration, but under certain circumstances, it may be advisable to utilize the once used solvent in other ways, and to employ, for the further extraction, fresh solvents, which, for example, have been produced jointly with the residue which is to be extracted. The coaly residues, which have been freed from oils, may serve directly, without being subjected to a low-temperature carbonization or after being treated further, as fuel for motors consuming pulverulent fuel, or may be converted into hydrogen in a suitable gas producer, which gasification process may be carried out at a comparatively low temperature.

A particularly advantageous method of operating is to perform the extraction in several stages, that is, by using a plurality of filters disposed in series, and, for example, to stir the mixture with the filtrate from the second filter whilst fresh solvent is used on the second filter, which solvent together with the extracted oil is passed to the first filter. In this way, the solvent and the mixture to be separated are brought together in counterflow. It is advantageous to conduct the filtration in the presence of a current of inert gases, which may be kept in circulation. For example, nitrogen, carbon dioxide or the like may be employed. Air is unsuitable, owing to the risk of explosion therewith and must be specially avoided when there is any prospect of its giving rise to the formation of asphaltum. The solvent is preferably introduced to the material to be treated continuously.

Filters of various kinds may be used for continuous filtration, such as flat cell filters, drum filters and others. Such of the filtering surfaces as are intended for receiving the charge of fresh material may be kept clean by mechanical means, such as blowing out with nitrogen, carbon dioxide and other inert flushing gases. It may be of advantage to subject the extracted material on the filter to subsequent washing, preferably with the solvent used, such as benzine and the like followed by the treatment with the hot inert flushing gases. The vapors of solvent carried off by the flushing gases are preferably recovered by condensation. The flushing gases can be returned into circulation.

The solvents can be recovered from the filtrates and residues in various ways, for example by distillation, low-temperature distillation, centrifuging, displacement and the like. In washing the solid filter cakes with solvent, a minimum amount of the latter should be used, this being preferably well distributed by the aid of special appliances, such as those of the type of compressed air atomizers, or with dropping devices or by means of rotating worms, brushes or discs, which partly dip into a bath of the solvent, and, if desired, with the employment of stripper arranged at a suitable distance and angle, for example, a baffle plate arranged adjustably in the direction of the jet of liquid splashing off, which plate directs the solvent uniformly and in a definite direction or to the substance to be washed. The said discs, several of which are preferably arranged on one axis are preferably smooth, and sharpened or toothed at their outer edge. If larger surfaces are to be sprayed, so called scattering plates, mounted obliquely on a shaft, which dip into the solvent and then on rotating scatter it over a large area, may be employed.

When drum filters are used, the material under treatment is filtered preferably by suction by means of a partial vacuum, the pressure being preferably not more than 350 millimeters of mercury. The level in the tank of the filter is preferably kept low, so that the layer of carbon on the filter becomes not too thick during the passage of drum, for example, not more than from 3 to 4 millimeters. The thickness may be varied according to the character of the mixture to be treated. In order to obtain uniform removal of the oil-freed residue, it is preferable to employ spring scrapers such as flexible blades of sheet steel or brass and the like. In many cases of working up residues from the destructive hydrogenation, for instance, when working up residues rich in asphaltum obtained from the products of destructive hydrogenation of pit coal, it will be advantageous to add the solvent to the material to be treated while this is still hot, for example at 150° C. and above, because the separation of solid constituents then proceeds far more easily both at an elevated temperature and at ordinary temperature. This method of working is particularly suitable when treating such residues as have a high solidification point. It has been found that under certain circumstances certain changes take place on cooling in mixtures which have been obtained at an elevated temperature, brought about, for example, by condensation, and that substances containing hydrocarbons which have been obtained at an elevated temperature when they have once cooled down, and have perhaps solidified are often much more difficultly soluble than such which have been treated with a solvent at an elevated temperature without intermediate cooling. The process may also be carried out in such a manner that the solvent is heated before being admixed with the substance to be treated. It is advantageous to cool down the hot product issuing from the reaction vessel, which is under pressure, by spraying it with a cold or somewhat preheated solvent, down to a temperature at which the pressure is to be released and in this way a very considerable heat economy is effected as no heat is consumed by special cooling devices. A further advantage is that products which have been thus diluted can be more easily conveyed, for example with the aid of pumps, and that a very thorough intermixing of the product to be treated with the solvent takes place.

The method of operating with one arrangement according to this invention having two drum filters will be more fully described with reference to the accompanying diagrammatic drawing, but it should be understood that the invention is not limited thereto.

The residues to be treated, for example, the product obtained from the destructive hydrogenation of coal, and from which the low boiling constituents have been removed are introduced into a vessel $M_1$ by way of the pipe A and stirred with the filtrate from a drum filter $F_2$ as hereinafter described and then conducted, by way of a turbo mixer T to the tank of the drum filter $F_1$. The filtrate passes to the still D, in which the heavy benzine is separated and from which it is returned to the process by a pump $P_2$ by way of a container O. The oil is removed at H. The residue from the filter $F_1$ is stirred with the heavy benzine in a mixer $M_2$ and passed to the tank of the filter $F_2$. The suction dried coal is washed with heavy benzine on the drum of the filter, after which it is dried thereon with hot nitrogen, admitted through L, and passed continuously into a low-temperature retort S, where the final volatile portions are expelled, these being condensed in the condenser $K_2$. The extracted residues are removed at B. The filtrate from $F_2$ is forced by the pump $P_1$ into $M_1$ and employed for stirring up the residues. The filtration in $F_1$ and $F_2$ proceeds in an atmosphere of nitrogen. The nitrogen is drawn through the filters by the pump V, is freed from benzine vapors in $K_1$ and is heated up in $S_1$ for return into circulation. The plant operates approximately as follows:—

1000 kilograms of oily residues from a destructive hydrogenation process with a content of 40 per cent of solid constituents and 60 per cent of oil, are treated at 90° C. in the filter $F_1$, with 1080 kilograms of filtrate from filter $F_2$, containing 9 per cent of oil and 91 per cent of heavy benzine; 610 kilograms of a carbonaceous residue are obtained containing 35 per cent of benzine oil mixture containing 17 per cent of heavy benzine and 18 per cent of oil, and 1440 kilograms of filtrate with 41 per cent of oil and 59 per cent of heavy benzine. The filtrate is passed into the still D. In addition, about 30 kilograms of distillate, in the form of pure heavy benzine, are obtained in the condenser $K_1$.

The 610 kilograms of carbonaceous residue with 35 per cent of benzine oil mixture obtained from the filter $F_1$, are treated on the filter $F_2$ with 1000 kilograms of pure heavy benzine recovered by distillation and low-temperature distillation, 500 kilograms of carbonaceous residues, with 18 per cent of benzine and 2 per cent of oil, being obtained. The benzine is recovered by low-temperature distillation in the still S. In addition to the carbonaceous residue, 1080 kilograms of filtrate with 9 per cent of oil and 91 per cent of heavy benzine, are obtained. In addition, 30 kilograms of benzine distillate are obtained in the condenser $K_1$.

The residues rich in asphaltum obtained from the destructive hydrogenation of pit coal, are preferably treated at an elevated temperature; for example, a middle oil, obtained in the same process and preheated to a temperature of 120° C. is sprayed on to a residue, still under high pressure, which has been cooled down to about 200° C. The pressure is released from the mixture at about 150° C., and the product is immediately worked up on the filter. The filtrate is subjected to distillation in order to separate the middle oil from the heavy oil, and the coaly residue is subjected to low-temperature carbonization in order to recover the middle oil still contained therein.

What we claim is:—

1. A plant for the continuous separation of oils, from residues obtained in the destructive hydrogenation of carbonaceous materials and consisting of mixtures of oils and solid matter, which comprises a first mixing vessel for bringing together the solvent and the oil bearing material provided with a supply pipe for the material from which oil is to be separated, a mixer, a pipe leading from the said vessel to said mixer, a first filter, a pipe leading from the mixer for conveying the mixture of the residue and the solvent from the said mixer to said first filter, a second mixing vessel, a pipe for conveying the filtered residues to said second mixing vessel, a second filter, a pipe leading from the said vessel to said second filter, a reservoir for fresh solvent with pipes leading both to the said second filtering vessel and to the second mixing vessel, a pipe for returning the filtrate from the second filter to the first mixing vessel, a pipe conveying the filtrate from the first filter to a distillation plant, in which the oil to be recovered is separated from the solvent, a pipe for returning the solvent to the reservoir for fresh solvent, and a low-temperature carbonization plant connected with the second filter by means of a pipe for conveying thereto the residues from the said filter.

2. A plant for the continuous separation of oils, from residues obtained in the destructive hydrogenation of carbonaceous materials and consisting of mixtures of oils and solid matter, which comprises a first mixing vessel for bringing together the solvent and the oil bearing material provided with a supply pipe for the material from which oil is to be separated, a mixer, a pipe leading from the said vessel to said mixer, a first drum filter, a pipe leading from the mixer for conveying the mixture of the residue and the solvent from the said mixer to said first drum filter, a second mixing vessel, a pipe for conveying the filtered residues to said second mixing vessel, a second drum filter, a pipe leading from the said vessel to said second drum filter, a reservoir for fresh solvent with pipes leading both to the said second filtering vessel and to the second mixing vessel, a pipe for returning the filtrate from the second filter to the first mixing vessel, a pipe conveying the filtrate from the first filter to a distillation plant, in which the oil to be recovered is separated from the solvent, a pipe for returning the solvent to the reservoir for fresh solvent, and a low-temperature carbonization plant connected with the second filter by means of a pipe for conveying thereto the residues from the said filter.

In testimony whereof we have hereunto set our hands.

MATHIAS PIER.
ERNST HOCHSCHWENDER.
KURT WENZEL.